United States Patent

Thompson et al.

[11] Patent Number: 4,835,025
[45] Date of Patent: May 30, 1989

[54] BARRIER LAMINATES FOR CONTAINMENT OF ESSENTIAL OILS, FLAVORS, OXYGEN AND VITAMINS AND CARTONS MADE THEREFROM

[75] Inventors: Kenneth P. Thompson, Canton, N.C.; Richard C. Ihde, Strongsville, Ohio

[73] Assignee: Champion International Corporation, Stamford, Conn.

[21] Appl. No.: 191,354

[22] Filed: Jul. 11, 1988

Related U.S. Application Data

[60] Division of Ser. No. 34,641, Apr. 6, 1987, Pat. No. 4,777,088, which is a continuation-in-part of Ser. No. 848,940, Apr. 7, 1986, abandoned.

[51] Int. Cl.⁴ .............................................. B65D 15/22
[52] U.S. Cl. .................................. 428/34.2; 428/323; 428/475.5; 428/476.1; 428/513; 428/516
[58] Field of Search ...................... 428/34.2, 323, 340, 428/475.5, 476.1, 511, 513, 349, 516; 426/127; 229/3.1, 3.5 R

[56] References Cited

U.S. PATENT DOCUMENTS 3,972,467 8/1976 Whillock et al. .................. 428/511

Primary Examiner—Ellis P. Robinson
Assistant Examiner—James J. Seidleck
Attorney, Agent, or Firm—Evelyn M. Sommer

[57] ABSTRACT

A laminate providing an effective barrier to the migration of essential oils and/or flavorings, such as d-limonene and for the retention of Vitamin C, is provided comprising from the outer surface to the inner surface, a paperboard substrate, a web of nylon directly coated thereon, a web of Surlyn overlying and in contact with said nylon web and a web of olefin overlying and in contact with said Surlyn web. Preferably the paperboard substrate is also coated on the external surface thereof with a web of heat sealable polymer. Containers constructed from such laminates are especially useful as fruit juice containers which enable significant flavor and Vitamin C retention in the liquid i.e., fruit juice contained therein over the normal shelf life of the product.

4 Claims, 3 Drawing Sheets

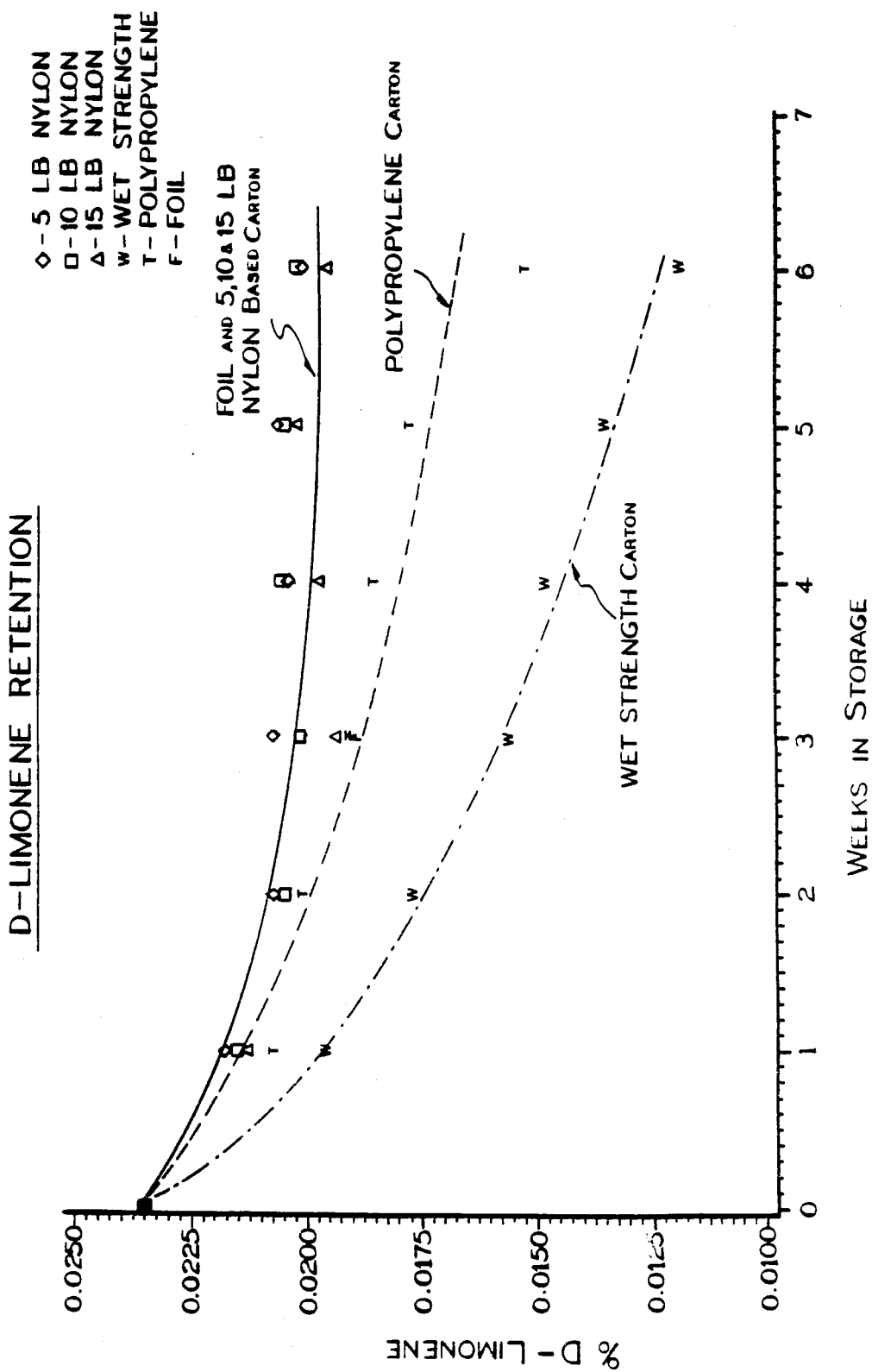

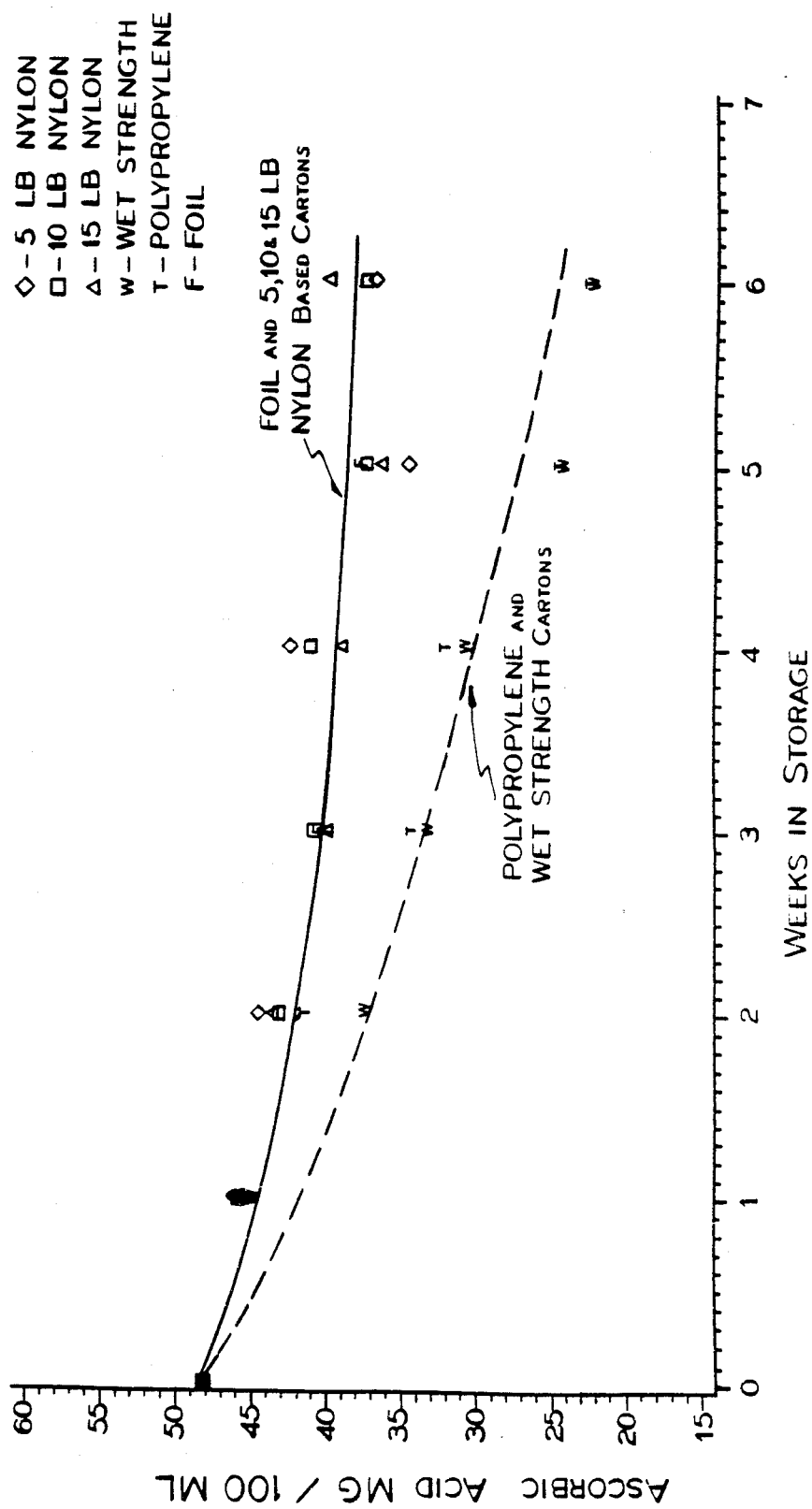

BARRIER LAMINATES FOR CONTAINMENT OF ESSENTIAL OILS, FLAVORS, OXYGEN AND VITAMINS AND CARTONS MADE THEREFROM

This application is a division of application Ser. No. 034,641 filed Apr. 6, 1987 issued to U.S. Pat. No. 4,777,088 which is a continuation-in-part of application Ser. No. 848,940 filed Apr. 7, 1986 and now abandoned.

This invention relates to barrier laminates for the containment of essential oils, flavors, oxygen and vitamin C and to cartons made therefrom. More particularly, this invention relates to barrier laminates useful in the manufacture of cartons which hold liquids containing essential oils, flavorings and vitamin C such as fruit juices.

For many years, food experts have been critical of the standard polyethylene coated paperboard containers currently on the market because not only the essential oils and flavoring contained in fruit juices could diffuse through the polyethylene coating itself to deposit in the paperboard thereby downgrading the initial flavor of the fruit juice in a very marked manner during its standard shelf life, but also the beneficial vitamin C contained in the juice was not retained therein.

While the migration of the essential oils and flavorings and the loss of the vitamin C could be substantially reduced by the use of a laminate containing a metal foil therein mounted as a liner along the interior of the container, the economics involved in using a metal foil preclude this solution from being a viable alternative. Despite the fact that many attempts have heretofore been made to enable the replacement of metallic foil with a polymeric laminate which would enable essential oil, flavor, and vitamin C retention throughout the standard shelf life at a relatively low cost, all such efforts to date have substantially failed to come up with a reasonable substitute for metal foil.

In applicant's recently issued U.S. Pat. No. 4,513,036 a laminate is disclosed which provides a substantial barrier to the migration of essential oils and/or flavors therethrough. This is achieved by a laminate comprising, from the outer surface to the inner surface contacting said essential oils and/or flavors: a paperboard substrate, a web of propylene polymer coated thereon and a web of olefin polymer overlying said propylene polymer web and rendering the resulting laminate heat-sealable. It has been found that cartons constructed of the laminate of U.S. Pat. No. 4,513,036 enable significant flavor retention of the fruit juice contained therein resulting in a significant extension of the shelf life of the cartons and permit the replacement of an otherwise required aluminum foil barrier at considerable economic savings. However, cartons constructed from these laminates were no more effective than the conventional "wet strength" or polyethylene coated board cartons for retaining vitamin C. The foil cartons were clearly more effective but at a cost discouraging their use.

Now, in accordance with the present invention, it has been found that a laminate providing not only a substantial barrier to the migration of essential oils and/or flavors therethrough but providing for retention of vitamin C is achieved by a laminate comprising from the outer surface to the inner surface in contact with the fruit juice: a paperboard substrate, a web of nylon coated directly thereon, a web of Surlyn directly overlying the nylon web and a web of olefin polymer, typically polyethylene directly overlying and in contact with the Surlyn web and rendering the resulting laminate heat sealable. It has been found that cartons constructed of the laminate of the present invention enable significant essential oil, flavor and vitamin C retention in the fruit juice contained therein resulting in a significant extension of the shelf life of the packaged product and permitting the replacement of the otherwise required aluminum foil barrier at considerable economic savings.

The laminate of the invention further provides an effective barrier to the passage of oxygen, thus preserving and protecting vitamins and in particular vitamin C and other nutrients contained in the beverage or juice product from oxidative degradation. As above noted, this laminate additionally provides an excellent barrier to the migration of essential oils and/or flavors therethrough.

In the container field, it has been common practice to use many forms of materials which are heat-sealed or glued and otherwise converted on conventional equipment to form a container or carton. Such containers are those typically known in the trade as "folding boxes", containers or cartons.

By way of example, one such carton is the gable-top milk carton and carton blanks therefor which are specifically disclosed in U.S. Pat. No. 3,120,333 as liquid tight containers. Essentially, blanks used in the manufacture of such containers include a paperboard base, extrusion coated on both sides with a resin, such as polyethylene, to provide a moisture barrier and to provide means for heat-sealing the carton.

In a typical carton converting operation, once the resin-blanks are cut and scored, the resin on an outer surface of a glue flap and the resin on an inner surface of a carton panel are heated by direct flame application while the heated carton surfaces extend in guided but essentially unsupported, i.e., not compressed between two heating jaws, condition over the edges of a conveying belt. The carton panels are then folded over to form a flattened tube, the now molten tacky resin on the heated surfaces are pressed together at a downstream nip to form a liquid-tight side seam. The cartons, in a flattened tube form, are then shipped to users such as dairies or juice manufacturers where they are erected by further heat-sealing, filled and finally sealed.

These familiar gable-top cartons have been extensively used throughout the United States to contain milk or juices. While the cartons prepared on the basis of the laminate structures disclosed in U.S. Pat. No. 4,513,036 are effective to provide significant flavor and essential oil retention, the problem of the loss of vitamin C still remains.

Many attempts have heretofore been made to overcome the problems of the loss of vitamin C. One attempt involves the use of a liner for the internal surface of the container comprising a laminate having two or more laminae of polyolefin or other polymeric material sandwiching a metallic foil therebetween. The presence of the metallic foil significantly reduces not only moisture transmission and loss of essential oils to the paperboard, but also is effective to reduce the loss of vitamin C. The use of metallic foil, however, complicates processing and significantly increases the cost of the resulting product.

Other attempts at overcoming these problems have resulted in the suggestion to use homogeneous, all-plastic containers such as can be formed by a blow-molding operation. By virtue of the fact that these containers are completely formed and that their transportation to the dairy or juice packer thus includes transporting the air in them, shipping charges are substantially increased over shipping charges for similar volume containers which can be shipped in a flattened condition. Moreover, such containers are not readily adaptable to inexpensive printed decorations. Most important, the conventional plastics used in blow molding have not demonstrated any improvement in the vitamin C retention as would justify their use.

All-plastic carton blanks cut and scored in patterns similar to those of the resin-coated paperboard cartons described hereinabove have also been developed. However, when these plastic containers are run through a typical resin-coated paperboard converter, extra attention and care has to be taken with the side-seaming by direct flame application to the unconfined container surfaces.

Thus, while homogeneous all-plastic blanks could possibly be sealed by some known heat-sealing technique such as a static system wherein the heated areas are supported or confined, for example, between heating jaws, no such other known techniques are capable of high commercial production speed (see U.S. Pat. No. 4,224,092). Moreover, the use of other sealing techniques would require the converter to purchase additional equipment to provide efficient sealing of the all-plastic container at considerable expense and also rendering the currently available equipment obsolete. Accordingly, such all-plastic containers have not been commercially accepted to any significant degree. In any event, the all plastic containers as in the case of the blow molded containers, do not prevent the loss of vitamin C of the juice product contained therein.

Thus, until the advent of the present invention, no suitable containers for the containment of fruit juices without loss of vitamin C have been developed which retain the advantages of using paperboard as the base material and yet eliminate both the processing and economic disadvantages of the use of metal foil.

The advantages of the present invention will become more readily apparent from the following detailed description and drawing in which:

FIG. 3 is a graphic representation showing retention of D-limonene of cartons made from different laminates over differing periods of juice storage.

FIG. 4 is a graphic representation showing retention of ascorbic acid of cartons made from different laminates over different periods of juice storage.

The invention described herein is particularly useful as a paperboard laminate employed in the manufacture, for example, of containers of many various types. Such containers, for example, may comprise folding boxes, square or rectangular containers or cartons, or simply cylindrical tubes having a bottom closure means and generally also a top closure means.

For example only, one particular form of container configuration with which the present invention is highly useful is the gable-top carton for the containment of liquids described, for example, in U.S. Pat. No. 3,120,333.

Figure 1:
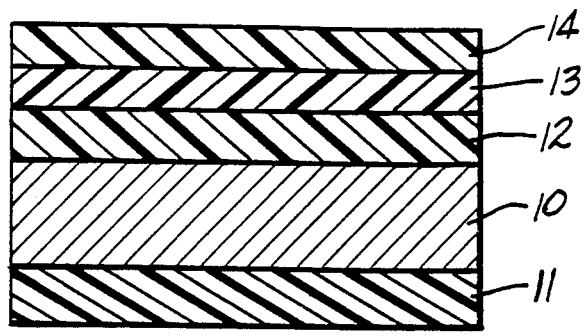
FIG. 1 is a cross-sectional elevation of one embodiment of the laminate of the present invention.

Referring now to FIG. 1, the laminate of the present invention is shown as comprising a paperboard substrate 10 which is most suitably high-grade paperboard stock, for example 0.010 to 0.028" milk carton stock onto which is applied a web of nylon 12 in a coating weight range of 5–15 pounds per ream. Directly overlying said nylon web 12 is a web of Surlyn 13 applied in a coating weight range of 2–6 pounds per ream. Surlyn is DuPont's tradename for the ionomer poly(ethylene-co-methacrylic acid). Surlyn, its chemical structure, properties, preparation and manufacture as described in detail in the Kirk Othmer Encyclopedia of Chemical Technology, 3rd Edition, 1984—Supplement Volume. Overlying and in contact with the Surlyn web is a web of heat sealable olefin polymer 14, for example low density polyethylene, in a coating weight ranging from about 4 to about 12 pounds per ream.

Preferably, the olefin polymer is polyethylene and most preferably, a low density polyethylene. Typical of the preferred low density polyethylenes which can be employed as web 14 is Gulf 4517 polyethylene available from Gulf Oil Chemicals Company, Houston, Tex. The olefin polymer web 14 is applied in a coating weight ranging from about 5 to about 20 pounds per ream.

A preferred Surlyn is DuPont's Surlyn AD 8255 which is an extrudable terionomer resin (zinc metal salt of an ethylene-based terpolymer) and available in pellet form for use in conventional extrusion equipment designed to process polyethylene resins. Surlyn AD 8255 is characterized by its improved adhesion properties and particularly to nylon.

On the external surface of the paperboard substrate is coated a web of heat sealable olefin polymer 11, typically polyethylene and most preferably low density polyethylene. This external coating of olefin polymer imparts heat sealability to the ultimate container and also imparts a gloss to the external surface of the paperboard which with suitable but conventional treatment can be directly printed on.

Figure 2:
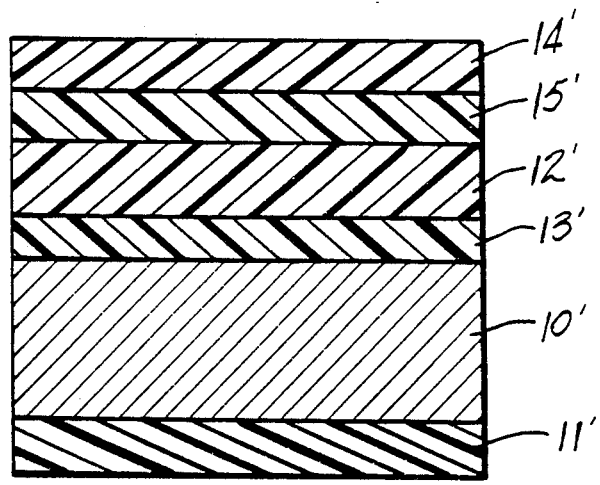
FIG. 2 is a cross-sectional elevation of an alternate embodiment of the laminate of the present invention.

Referring now to FIG. 2, wherein like numerals with a prime (') designation, designate laminae of the same type described in FIG. 1, an alternate embodiment of a laminate of the present invention is shown. In this alternate embodiment, the paperboard substrate 10' is coated on the external surface thereof with a web of heat-sealable olefin polymer 11, typically polyethylene and most preferably, low density polyethylene. As noted above, this external coating of olefin polymer imparts heat-sealability to the ultimate container construction and also imparts a gloss to the external surface of the paperboard which can be utilizing conventional techniques directly printed upon. Onto the internal surface of the paperboard substrate 10 there is applied a web of Surlyn 13' as described hereinafter. Overlying the Surlyn 13' web and in contact therewith is a web 12' of nylon over which a web 15' of Surlyn has been directly applied. Overlying the web 15' of Surlyn and in contact therewith is a web 14' of heat sealable olefin polymer which will ultimately form the internal surface of the container constructed therefrom.

The laminates of the present invention can be easily fabricated. For example, the nylon and Surlyn or the nylon, Surlyn and olefin polymer webs can be directly coextruded onto the paperboard substrate. Alternatively, in order to facilitate adhesion between the nylon and the paperboard, a layer of Surlyn can be simultaneously coextruded between the paperboard and the nylon webs as they are directly coextruded onto the paperboard substrate. Still further, if desired, a three- or four-pass coating operation can be employed whereby the nylon polymer web is extruded onto the paperboard substrate and, or subsequently overcoating the nylon barrier web with a web of Surlyn and of olefin polymer.

Although these specific coating techniques have been described, it is apparent to those skilled in the art that any conventional technique for applying the nylon, Surlyn polymer and olefin polymer webs to a paperboard substrate can be suitably employed.

The unique barrier effect provided by the laminate of the present invention to the transmission of essential oils, flavorings and vitamin C is clearly demonstrated by the following comparative example.

Standard paperboard ½ gallon orange juice containers were prepared and filled with orange juice. The principle essential oil in orange juice is d-limonene. The filled cartons were stored for a period of six weeks after which time the orange juice was analyzed to determine the percentage loss by weight of the essential oil d-limonene and the percentage loss by weight of vitamin C.

The standard ½ gallon orange juice container was constructed from a laminate consisting (from the outside of the container in) of 9.0 pounds per ream polyethylene, 0.024 milk carton stock and 20 pounds per ream polyethylene.

Another standard paperboard ½ gallon orange juice container was modified to contain an aluminum foil lining. The structure from the outside of the container in was 9.0 pounds per ream low density polyethylene, 0.024 milk carton stock, 10 pounds per ream low density polyethylene, 0.00035" aluminum foil and 20 pounds per ream low-density polyethylene.

A third class of comparative standard paperboard ½ gallon orange juice container was prepared from the laminate of U.S. Pat. No. 4,513,036 comprising from the outside of the container in 9.0 pounds per ream polyethylene, 0.024 milk carton stock, 10 pounds per ream of extrusion coating grade polypropylene and 10 pounds per ream low density polyethylene as well as with other coating weights of polypropylene and polyethylene.

Finally, standard paperboard ½ gallon orange juice containers were prepared using nylon, Surlyn, polyethylene coextrusion with several different coating weights of nylon.

The details and results of the experiments follow:

Retention of the essential oil, d-limonene, and of vitamin C, ascorbic acid, are the primary criteria for extended shelf life cartons for orange juice. A six week shelf life study, monitoring the effect of using various barrier layers, including barrier layers in accordance with the invention, in the carton construction, on the retention of these components, was carried out. The methodology and results of this study follow:

EXPERIMENTS

Two sets of experimental cartons were evaluated and compared to the standard wet strength, polypropylene and foil lined cartons for d-limonene and ascorbic acid retention over a six week period. The experimental cartons were prepared using board coatings which consisted of:

(1) nylon/surlyn/polyethylene coextrusion, with 5, 10 and 15 lbs/rm coatings of nylon, and
(2) polypropylene/ethylene methyl acrylate/polyethylene coextrusion with several different coating weights of polypropylene and polyethylene.

Actual thicknesses of experimental barrier layers were determined by microscopy. The MoCon unit, Ox-Tran 10/50, was used to make the oxygen transmission rate measurements. The extrusion coated boards were converted into cartons and then filled with orange juice from a single batch at one facility. The standard wet strength, polypropylene, and foil lined cartons were filled at the same time. Filled cartons were kept in refrigerated storage at 37° F. for the duration of the test. Orange juice samples were taken the next day after filling for the zero week reading, and at weekly intervals thereafter. Samples were tested for d-limonene and ascorbic acid by the procedures as hereinafter set out. In every case, except for the foil lined cartons, samples from two cartons were analyzed every week.

The method for determining d-limonene involves a co-distillation of orange juice with isopropyl alcohol, followed by acidification of the distillate and titration with standardized $KBr-KBrO_3$ solution. The reaction involves release of bromine, in situ, which then reacts with d-limonene's double bond to form limonene tetrabromide.

The ascorbic acid concentration in orange juice was determined by a modified 2,6-dichlorophenol-indophenol titration method. The method involves titrating a sample containing ascorbic acid in the presence of metaphosphoric acid and acetic acid with the dichlorophenol-indophenol standard solution until a distinct pink color persists for 5 seconds. The dichlorophenol-indophenol standard solution is used as a standard oxidizing agent which is colored blue in alkali and red in acid, while the reduced form is colorless.

To validate these methods, several sets of orange juices packaged in various containers were purchased and analyzed for % limonene and % ascorbic acid utilizing the above methods. The results of triplicate analysis of Tropicana orange juice packaged in various containers are outlined below for reference:

| Sample ID | % Limonene | % Ascorbic Acid (mgs per 100 mL) |
|---|---|---|
| Glass Container | 0.0203 | 46.4 |
| Frozen Concentrate | 0.0174 | 45.7 |
| Conventional PE Coated Cartons | 0.0129 | 29.5 |

RESULTS AND DISCUSSION

The structures and oxygen transmission rates of the various experimental barrier layers used in this study are shown in Table I. The measured thicknesses of the nylon layers were very close to the target values. The oxygen transmission rates shown by these films are in the expected range based on other measurements reported in the literature. The carton constructions for the standard wet strength, polypropylene, and foil-lined cartons and the associated oxygen transmission values are noted in Table II for reference.

The results of the d-limonene and ascorbic acid retention analysis are presented in Tables III and IV. For ease of interpretation, the results for the nylon based samples, along with the benchmark samples, are plotted in FIGS. 3 and 4. It is clear that the results for the three nylon based cartons are indistinguishable from those for the foil lined cartons for both d-limonene and vitamin C retention. Clearly, a 5 lbs/rm coating of nylon provides a barrier as good as foil and no further advantage is gained by increasing the coating weights to 10 and 15 lbs/rm. The polypropylene carton shows a clear advantage over the standard wet strength or polyethylene coated carton in d-limonene retention but no real advantage in vitamin C retention.

The results for polypropylene based cartons are shown in FIGS. 3 and 4. For d-limonene retention, all of the polypropylene based cartons show improved performance over the standard wet strength or polyethylene coated carton. However, there appear to be no clear trends in performance among the various polypropylene based cartons, which range in polypropylene coating weights from 1.7 to 19.6 lbs/rm. This may imply that the improved performance of polypropylene based cartons is attributable to some synergistic effect of polypropylene and polyethylene rather than the thickness of the polypropylene layer.

The vitamin C retention results of polypropylene based cartons are similar. There is no clear trend with polypropylene coating weight, except when the total polymer coating weight is about twice as high as the polypropylene carton. And, even then, the effect is small. These observations are not surprising in view of the data on oxygen transmission rates.

The results on ascorbic acid retention, coupled with the oxygen transmission rate data on all of the samples examined indicate that the range of interest in this application for barrier layer oxygen transmission rates is between ~10 and ~130 cc/100 sq in/24 hr. At rates above ~130 cc/100 sq in/24 hr, no benefit is obtained; and, at rates below ~10 cc/100 sq in/24 hr. no further improvement in benefits is available. This observation is of value in determining the most cost effective coating weight for nylon and also for evaluation of other barrier layers.

SUMMARY OF RESULTS (1) Inclusion of a nylon layer at a coating weight of 5 lbs/rm. or higher, in the carton construction provides d-limonene and vitamin C retention levels indistinguishable from the foil lined carton.

(2) The polypropylene carton is clearly superior to the standard wet strength polyethylene carton in d-limonene retention; but, as expected, provides no advantage in vitamin C retention.

(3) Varying the polypropylene content in the polypropylene coated carton construction from a high of 19.6 lbs/rm to a low of 1.7 lbs/rm showed no significant difference in d-limonene or vitamin C retention.

TABLE I
EXTENDED SHELF LIFE STUDY STRUCTURES AND OXYGEN TRANSMISSION RATES OF BARRIER LAYERS FOR VARIOUS CARTONS

Nylon Based:

| Sample | Nominal/Measured* (lbs/3000 sq ft) | | | O₂ Transmission (cc/100 sq in/24 hr) |
|---|---|---|---|---|
| | Nylon | Surlyn | Polyethylene | |
| 1 | 5/5.6 | 4/4.1 | 6/12.8 | 9.4 |
| 2 | 10/9.9 | 4/2.9 | 6/11.2 | 4.3 |
| 3 | 15/14.6 | 4/3.5 | 6/12.8 | Not tested |

Polypropylene Barrier Film Optimization:

| Sample | Measured* (lbs/3000 sq ft) | | | O₂ Transmission (cc/100 sq in/24 hr) |
|---|---|---|---|---|
| | Polypropylene | Ethylene Methyl Acrylate | Polyethylene | |
| P1 | 6.8 | 4.2 | 7.5 | 320 |
| P2 | 6.5 | 4.5 | 9.9 | 331 |
| P3 | 3.4 | 3.5 | 7.2 | 532 |
| P4 | 1.7 | 3.5 | 9.2 | 513 |
| P5 | 19.6 | 6.0 | 18.9 | 130 |

*Densities used in computation:
Polyethylene 0.923 gm/cc
Polypropylene 0.905 gm/cc
Nylon 1.13 gm/cc
Surlyn 0.940 gm/cc
Ethylene Methyl Acrylate 0.923 gm/cc

TABLE II
EXTENDED SHELF LIFE STUDY STRUCTURES AND OXYGEN TRANSMISSION RATES OF COMPARISON CARTONS

| | Carton: Nominal Side Wall Construction per 3000 sq ft | | | O₂ Transmission (cc/100 sq in/24 hr) |
|---|---|---|---|---|
| | Gloss Side | Board | Matte Side | |
| Standard Wet Strength | 9 lbs PE | 280 lbs | 11 lbs PE | 280 |
| Polypropylene | 10 lbs PE | 280 lbs | 12 lbs PP/10 lbs PE | Not Tested |
| Foil lined | 10 lbs PE | 280 lbs | 10 lbs PE/14.9 lbs Al/20 lbs PE | .06 |

TABLE III
EXTENDED SHELF LIFE STUDY % D-LIMONENE RETENTION

| Sample+ | WEEK | | | | | | |
|---|---|---|---|---|---|---|---|
| | 0 | 1 | 2 | 3 | 4 | 5 | 6 |
| Nylon Based: | | | | | | | |
| 1 | .0236 | .0217 | .0204 | .0207 | .0206 | .0208 | .0200 |
| | .0232 | .0218 | .0209 | .0207 | .0201 | .0204 | .0201 |
| 2 | .0236 | .0216 | .0209 | .0198 | .0208 | .0207 | .0200 |
| | .0237 | .0214 | .0210 | .0204 | .0202 | .0202 | .0204 |
| 3 | .0236 | .0216 | .0207 | .0193 | .0196 | .0202 | .0197 |
| | .0239 | .0210 | .0208 | .0194 | .0198 | .0202 | .0194 |
| Comparisons: | | | | | | | |
| Wet Strength | .0231 | .0196 | .0179 | .0155 | .0147 | .0134 | .0120 |
| | .0231 | .0195 | .0174 | .0156 | .0148 | .0136 | .0118 |
| Polypropylene | .0240 | .0206 | .0203 | .0192 | .0184 | .0180 | .0153 |
| | .0237 | .0208 | .0198 | .0188 | .0186 | .0174 | .0151 |
| Foil | NT* | .0218 | NT | .0189 | NT | .0201 | NT |
| Polypropylene Barrier Film Optimization: | | | | | | | |
| P1 | .0235 | .0214 | .0202 | .0188 | .0184 | .0172 | .0162 |
| | .0235 | .0215 | .0200 | .0192 | .0184 | .0174 | .0162 |
| P2 | .0234 | .0219 | .0203 | .0184 | .0182 | .0165 | .0162 |
| | .0244 | .0218 | .0200 | .0176 | .0184 | .0170 | .0161 |
| P3 | .0237 | .0224 | .0199 | .0186 | .0177 | .0165 | .0138 |
| | .0234 | .0231 | .0196 | .0184 | .0176 | .0166 | .0138 |
| P4 | .0232 | .0213 | .0199 | .0172 | .0172 | .0155 | .0144 |
| | .0237 | .0214 | .0198 | .0182 | .0172 | .0154 | .0143 |
| P5 | .0227 | .0208 | .0188 | .0172 | .0171 | .0165 | .0147 |
| | .0234 | .0198 | .0188 | .0170 | .0168 | .0164 | .0146 |
| Grand Avg: | 02352 | | | | | | |

*NT = Not Tested
+For Detailed Constructions, see Tables I and II

TABLE IV
EXTENDED SHELF LIFE STUDY ASCORBIC ACID RETENTION (Milligrams Per 100 mls Orange Juice)

| Sample+ | WEEK | | | | | | |
|---|---|---|---|---|---|---|---|
| | 0 | 1 | 2 | 3 | 4 | 5 | 6 |
| Nylon Based: | | | | | | | |
| 1 | 47.4 | 45.9 | 44.3 | 39.3 | 41.1 | 34.7 | 36.5 |
| | 50.1 | 45.3 | 44.7 | 40.6 | 43.6 | 34.2 | 37.0 |

TABLE IV-continued
EXTENDED SHELF LIFE STUDY
ASCORBIC ACID RETENTION
(Milligrams Per 100 mls Orange Juice)

| Sample+ | WEEK | | | | | | |
|---|---|---|---|---|---|---|---|
| | 0 | 1 | 2 | 3 | 4 | 5 | 6 |
| 2 | 48.5 | 45.3 | 43.3 | 40.2 | 41.1 | 38.1 | 37.5 |
| | 48.5 | 45.3 | 42.9 | 41.5 | 41.1 | 36.7 | 37.5 |
| 3 | 48.5 | 44.8 | 43.3 | 39.7 | 39.6 | 36.7 | 40.5 |
| | 50.1 | 46.4 | 43.8 | 40.2 | 38.6 | 36.2 | 39.5 |
| Comparisons: | | | | | | | |
| Wet Strength | 47.4 | 43.2 | 37.3 | 32.9 | 30.2 | 23.8 | 22.3 |
| | 49.0 | 45.3 | 37.3 | 33.3 | 31.2 | 24.3 | 21.8 |
| Polypropylene | 48.0 | 45.9 | 41.0 | 34.2 | 32.2 | 24.3 | 21.8 |
| | 49.5 | 44.8 | 41.5 | 34.2 | 31.7 | 24.3 | 22.8 |
| Foil | NT* | 45.3 | NT | 40.2 | NT | 38.1 | NT |
| | NT | 45.3 | NT | 42.5 | NT | 37.7 | NT |
| Polypropylene Barrier Film Optimization: | | | | | | | |
| P1 | 44.8 | 43.8 | 39.6 | 36.1 | 32.2 | 20.8 | 21.8 |
| | 48.5 | 43.2 | 38.7 | 35.2 | 33.2 | 21.3 | 21.3 |
| P2 | 47.4 | 43.2 | 37.3 | 34.2 | 31.7 | 18.3 | 17.7 |
| | 47.4 | 43.2 | 38.2 | 34.2 | 31.2 | 19.3 | 16.7 |
| P3 | 45.9 | 44.3 | 37.3 | 33.8 | 28.7 | 20.8 | 19.2 |
| | 48.0 | 43.8 | 37.3 | 33.8 | 31.7 | 19.8 | 18.7 |
| P4 | 49.0 | 42.7 | 37.3 | 35.2 | 31.2 | 18.8 | 22.3 |
| | 48.0 | 43.2 | 38.2 | 35.6 | 30.2 | 18.8 | 21.3 |
| P5 | 49.0 | 44.8 | 40.1 | 35.2 | 33.2 | 25.3 | 26.3 |
| | 49.0 | 45.3 | 38.7 | 35.6 | 35.7 | 25.3 | 27.4 |
| Grand Avg: | 48.2 | | | | | | |

*NT = Not Tested
+For Detailed Constructions, see Tables I and II

In accordance with a preferred embodiment of the invention, the laminate has incorporated into a suitable intermediate layer particles of a pigment such as aluminum powder or a food grade dye for providing a suitable and more attractive coated product.

The adhesion characteristics of the film layers are not interfered with and the use of the pigment and/or colorant is applicable to a coextrusion process.

The pigmented or colored coated paperboard material comprises a paperboard substrate 10 onto which are coextruded the nylon 12, followed by the Surlyn 13 and the heat sealable olefin polymer 14, with the pigment or colorant incorporated into either the nylon 12 or Surlyn 13 layer and preferably in this construction, into the nylon.

In the structure shown in FIG. 2, the pigment or colorant is incorporated into any of the layers of Surlyn 13' nylon 12' and Surlyn 15'.

The pigment or colorant is preferably aluminum particles, but the coated paperboard can be pigmented with any color i.e., white, terra-cotta, blue, yellow, so long as the pigment chosen has sufficient heat resistance to withstand the extrusion conditions. Typically, any suitably colored heat resistant pigment can be employed, i.e., animal pigments, synthetic pigments, elemental pigments e.g., carbon black or aluminum powder, inorganic pigments such as inorganic oxides, sulfides, hydroxides, carbonates, silicates, chromates, sulfates, and the like, as well as organic pigments. As colorants, any certified color i.e., FD & C color permissible for use in foods, drugs or cosmetics may be used if they additionally meet the requirement of compatibility with the extrusion process.

The pigment or colorant is incorporated into the intermediate film forming layer i.e., nylon or Surlyn in an amount of from about ½ to about 15 weight percent, preferably from 1 to 10 weight percent and more preferably from 1½ to 6 weight percent.

The aluminum is preferably used in the form of finely divided aluminum powder and is most conveniently added to the nylon or Surlyn in the form of a blend thereof in the same polymer.

If $TiO_2$ is used as a pigment, it can be used, as is conventional in the plastic industry.

The various layers including the intermediate layer containing the pigment are extruded or coextruded onto the paperboard substrate by methods well known in the art.

In accordance with still another embodiment of the invention, it has been found that satisfactory results with respect to essential oil, flavoring and Vitamin C retention are realized if the nylon is extruded directly onto paperboard and the nylon surface then primed. Following priming, polyethylene is extruded directly onto the nylon surface.

In accordance with this embodiment of the invention, a laminate constituting an effective barrier to the migration of essential oils and/or flavorings therethrough and for the retention of the vitamin C contained in the juice, is provided comprising from the outer surface to the inner surface which is in contact with the liquid, a paperboard substrate, a web of nylon which has been primed prior to the application of an overlying web of olefin polymer and preferably polyethylene. This laminate is suitable for use in constructing the standard juice container as hereinbefore described.

The nylon is applied in an amount of 5 to 17 pounds per ream, the nylon surface treated with corona and then gas flame priming.

Subsequently 12.0 pounds per ream of polyethylene #4517 are applied onto the nylon.

What is claimed is:

1. A container for liquids containing essential oils and/or flavorings and vitamin C constructed from a laminate providing an effective barrier to the migration of essential oils and/or flavorings therethrough and for retention of vitamin C contained in fruit juices comprising, from the outer surface to the inner surface contacting said fruit juice; a paperboard substrate, a web of nylon coated directly thereon, a web of poly(ethylene-co-methacrylic acid) partially neutralized with sodium and zinc cations directly overlying and in contact with said nylon web and a web of olefin polymer directly overlying and in contact with said web of poly(ethylene-co-methacrylic acid).

2. A container for liquids containing essential oils and/or flavorings and vitamin C according to claim 1, wherein said laminate additionally comprises an outer olefin polymer web on the surface of the paperboard substrate opposite the nylon web coated surface.

3. A container for liquids containing essential oils and/or flavorings and vitamin C according to claim 1, wherein said laminate additionally comprises a web of poly(ethylene-co-methacrylic acid) partially neutralized with sodium and zinc cations between the paperboard substrate and the nylon web normally adjacent thereto.

4. A container for liquids containing essential oils and/or flavorings and vitamin C according to claim 1, wherein in said laminate one of said nylon and poly(ethylene-co-methacrylic acid) webs contains a pigment or food grade colorant.

* * * * *